(12) United States Patent
Heo (10) Patent No.: US 6,901,038 B2
(45) Date of Patent: May 31, 2005

(54) AUDIO RECORDING MEDIUM, METHODS OF RECORDING DATA ON AND REPRODUCING DATA FROM THE RECORDING MEDIUM, AND RECORDING AND REPRODUCING APPARATUSES THEREFOR

(75) Inventor: Jung-kwon Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 864 days.

(21) Appl. No.: 09/736,577

(22) Filed: Dec. 15, 2000

(65) Prior Publication Data

US 2001/0048648 A1 Dec. 6, 2001

(30) Foreign Application Priority Data

Jun. 2, 2000 (KR) ........................................ 2000-30402
Jun. 24, 2000 (KR) ........................................ 2000-35039
Nov. 17, 2000 (KR) ........................................ 2000-68503

(51) Int. Cl.$^7$ ................................................ G11B 5/09
(52) U.S. Cl. ............................. 369/47.22; 369/53.41; 369/59.25
(58) Field of Search .................... 369/275.3, 47.11, 369/47.15, 47.16, 47.22, 47.27, 47.31, 47.42, 47.54, 59.25, 59.26, 59.23, 59.24, 53.2, 53.24, 53.41, 30.04, 30.1, 30.13; 360/48

(56) References Cited

U.S. PATENT DOCUMENTS

| | | | | |
|---|---|---|---|---|
| 5,018,028 A | * | 5/1991 | Sakata et al. | 369/59.27 |
| 5,422,868 A | * | 6/1995 | Koizumi et al. | 369/47.22 |
| 5,530,686 A | * | 6/1996 | Schylander et al. | 369/30.04 |
| 5,602,815 A | * | 2/1997 | Klappert et al. | 369/59.25 |
| 5,715,224 A | * | 2/1998 | Fujinami | 369/47.16 |
| 6,272,081 B1 | | 8/2001 | Murata | |
| 6,396,781 B2 | * | 5/2002 | Ishii et al. | 369/53.41 |
| 6,633,515 B1 | * | 10/2003 | Van Nieuwenhoven et al. | 369/30.04 |

FOREIGN PATENT DOCUMENTS

| | | |
|---|---|---|
| EP | 0 833 338 A2 | 4/1998 |
| EP | 0 986 060 A1 | 3/2000 |
| EP | 0 987 709 | 3/2000 |
| JP | 4-126385 | 4/1992 |
| JP | 6-76547 | 3/1994 |
| JP | 7-6568 | 1/1995 |
| JP | 7-311943 | 11/1995 |
| JP | 11-191285 | 7/1999 |
| JP | 11-203794 | 7/1999 |
| JP | 11-213569 | 8/1999 |
| JP | 2002-74850 | 3/2000 |

OTHER PUBLICATIONS

K C Pohlmann, "The Compact Disc System", pp. 47–101, XP002163595.

English Language Abstract for Japanese Publication No. 11162145, published Jun. 18, 1999.

Patent abstract for Japanese Application No. 10–199211, filed Jul. 31, 1998.

Patent abstract for Japanese Application No. 08–49792, filed Sep. 27, 1996.

Patent abstract for Japanese Application No. 8–102172, filed Apr. 16, 1996.

* cited by examiner

Primary Examiner—Thang V. Tran
(74) Attorney, Agent, or Firm—Staas & Halsey LLP (57) ABSTRACT

An audio recording medium, methods for recording data on and reproducing data from the audio recording medium, and recording and reproducing apparatuses therefor. In the audio recording medium, audio data are recorded in a plurality of tracks in predetermined write units, and identification data for indicating the start position of each of the tracks, such as mute data, are recorded in write units segregated from the predetermined write units of the audio data. Thus, if a mute period is unnecessary, the mute data can be easily removed.

22 Claims, 3 Drawing Sheets

FIG. 6

AUDIO RECORDING MEDIUM, METHODS OF RECORDING DATA ON AND REPRODUCING DATA FROM THE RECORDING MEDIUM, AND RECORDING AND REPRODUCING APPARATUSES THEREFOR

CROSS-REFERENCE TO RELATED APPLICATIONS

This application claims the benefit of Korean Application No. 00-30402, filed Jun. 2, 2000, and Korean Application No. 00-35039, filed Jun. 24, 2000, and Korean Application No. 00-68503, filed Nov. 17, 2000, all filed in the Korean Patent Office, the disclosures of which are incorporated herein by reference.

BACKGROUND OF THE INVENTION

1. Field of the Invention

The present invention relates to the audio data field, and more particularly, to an audio recording medium including a plurality of tracks which audio data are recorded on and reproduced from, methods for recording data on and reproducing data from the audio recording medium, and recording and reproducing apparatuses therefor.

2. Description of the Related Art

Figure 1:
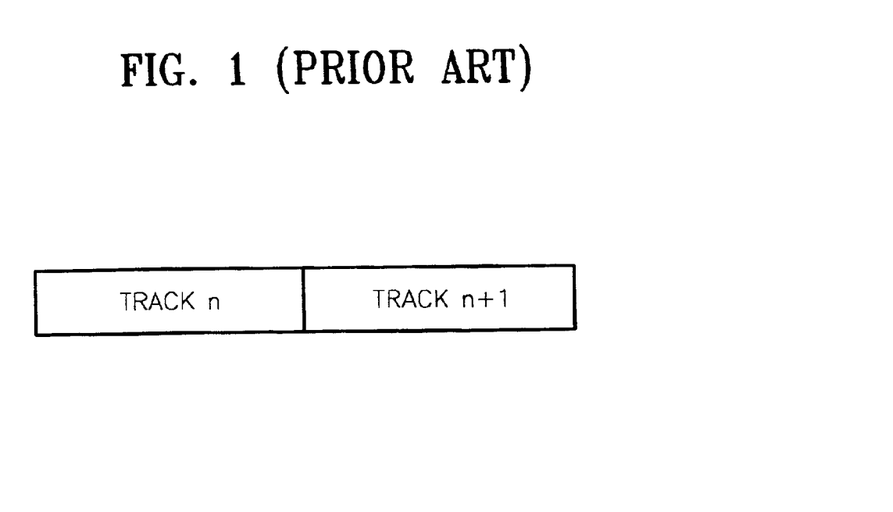
FIG. 1 is a schematic view illustrating the configuration of tracks in a conventional audio recording medium.

As for conventional digital audio recording media, such as midi discs (MDs), separate music files are continuously recorded on tracks, as shown in FIG. 1, by a digital audio recording apparatus. Accordingly, when such music files are reproduced from the tracks, the start and ending of each file can be indistinct if no pause period exists between the tracks.

For this reason, conventional compact discs (CDs) are provided with the mute data area assigned with Index 0. In other words, when a conventional digital audio recording apparatus receives digital audio data through a digital interface from a CD player and records the digital audio data in such a recording medium, mute data are also written to the mute data area having Index 0 of each track, such that the mute period exists between each of the tracks. As a result, although the audio data are continuously reproduced from the tracks, each of the tracks can be identified due to the presence of the mute periods.

When the conventional digital audio recording apparatus records mute data in the area with Index 0 and audio data in other index areas of a CD, the mute data and the audio data are recorded within a single write unit. Data recording and erasure from such digital audio media are performed in write units. Thus, it is almost impossible to erase only mute data from the tracks while audio data written within the same write unit remain on the recording medium.

SUMMARY OF THE INVENTION

To solve the above problems, it is an object of the present invention to provide an audio recording medium which mute data can be easily recorded on and deleted from, methods for recording data on and reproducing data from the audio recording medium, and recording and reproducing apparatuses therefor.

It is another object of the present invention to provide an audio recording medium in which a mute period can be easily adjusted, methods of recording data on and reproducing data from the audio recording medium, and recording and reproducing apparatuses therefor.

It is still another object of the present invention to provide a method of recording data received from a CD player, in which mute data from a mute period with Index 0 can be recorded such that the mute data can be reproduced for the corresponding mute period in a reproduction mode.

Additional objects and advantages of the invention will be set forth in part in the description which follows, and, in part, will be obvious from the description, or may be learned by practice of the invention.

According to an aspect of the present invention, there is provided an audio recording medium in which audio data are recorded in a plurality of tracks and identification data for indicating the start position of each of the tracks are recorded in write units segregated from the audio data.

It is preferable that the identification data are recorded in at least one write unit at the start of each of the tracks, and the audio data are recorded in at least one write unit, following the identification data recorded in the at least one write unit. It is more preferable that the write unit may include an audio object unit (AOBU), and the identification data includes mute data.

It is preferable that a mute period for the mute data is equal to or shorter than the duration of a single AOBU, and the mute period includes a duration from a track start point to the end of the AOBU with mute data, and the mute period is varied by moving the location of the track start point. If a mute period for the mute data is longer than the duration of a single AOBU, the number of the AOBUs with mute data can be determined such that the sum of the duration of each of the AOBUs is equal to or slightly longer than the mute period. In this case, the mute period may include a period from a track start point to the end of the last AOBU among the plurality of the AOBUs with mute data, and the mute period may be varied by moving the location of the track start point. It is preferable that information on the mute period is recorded in a reproduction control information area, and the mute data are indexed with Index 0.

According to another aspect of the present invention, there is provided a method of recording data in a plurality of tracks of a recording medium, and reproducing data from the recording medium, the method comprising: recording identification data for indicating the start position of each of the tracks in predetermined write units; and recording audio data in write units segregated from the predetermined write units of the identification data.

It is preferable that the recording and reproduction method further comprises: reading and reproducing the identification data recorded in the predetermined write units; and reading and reproducing the audio data recorded in the write units segregated from the predetermined write units of the identification data.

According to another aspect of the present invention, there is provided a method of reproducing data recorded in a plurality of tracks of a recording medium, the method comprising: reading and reproducing identification data for indicating the start position of each of the tracks, the identification data being recorded in predetermined write units; and reading and reproducing audio data recorded in write units segregated from the predetermined write units of the identification data.

According to another aspect of the present invention, there is also provided a method of reproducing data recorded in a plurality of tracks of a recording medium in which identification data for indicating the start position of each of the tracks are recorded in predetermined write units, and audio data are recorded in write units segregated from the predetermined write units of the identification data, the method comprising: once a reproduction command for a track is input, searching for the write units with audio data in the corresponding track; and reading and reproducing the audio data from the found write units.

According to another aspect of the present invention, there is provided a method of recording data in a plurality of tracks of a recording medium, and reproducing data from the recording medium, the method comprising: determining whether there is a need to record identification data for indicating the start position of each of the tracks in a particular track; if recording of the identification data is needed, recording the identification data in the particular track in at least one write unit; and recording audio data in the particular track in at least one write unit segregated from the at least one write unit of the identification data.

It is preferable that the recording and reproduction method further comprises: reading and reproducing the identification data recorded in the at least one write unit at the start of each of the tracks; and successively reading the audio data recorded in the at least one write unit, following the identification data, and reproducing the read audio data.

It is preferable that the identification data are recorded in at least one write unit at the start of each of the tracks, and the audio data are recorded in at least one write unit, following the identification data recorded in the at least one write unit. The write unit may include an audio object unit (AOBU), and the identification data may include mute data.

It is preferable that a mute period for the mute data is equal to or shorter than the duration of a single AOBU, and the mute period includes a duration from a track start point to the end of the AOBU with mute data, and the mute period is varied by moving the location of the track start point. If a mute period for the mute data is longer than the duration of a single AOBU, the number of the AOBUs with mute data can be determined such that the sum of the duration of each of the AOBUs is equal to or slightly longer than the mute period. In this case, the mute period may include a period from a track start point to the end of the last AOBU among the plurality of the AOBUs with mute data, and the mute period may be varied by moving the location of the track start point. It is preferable that information on the mute period is recorded in a reproduction control information area, and the mute data are indexed with Index 0.

According to another aspect of the present invention, there is provided an apparatus for recording data in a plurality of tracks of a recording medium, in which identification data for indicating the start position of each of the tracks are recorded in predetermined write units, and audio data are recorded in a track in write units segregated from the predetermined write units of the identification data.

It is preferable that the identification data are recorded in at least one write unit at the start of each of the tracks, and the audio data are recorded in at least one write unit, following the identification data recorded in the at least one write unit.

It is preferable that the recording apparatus comprises: a write unit generator of generating the at least one write unit with the audio data, and the at least one write unit with the identification data; a write portion writing each of the at least one write unit with the audio data and the identification data in the corresponding tracks; and a controller outputting a command to instruct generation of the at least one write unit with the identification data to the write portion.

According to another aspect of the present invention, there is provided an apparatus for reproducing data recorded in a plurality of tracks of a recording medium, in which identification data recorded in predetermined write units to indicate the start position of each of the tracks are read and reproduced, and audio data recorded in write units segregated from the predetermined write units of the identification data are read and reproduced.

It is preferable that the identification data recorded in at least one write unit at the start of each of the tracks are read and reproduced, and the audio data recorded following the identification data in at least one write unit segregated from the at least one write unit of the identification data are read and reproduced.

It is preferable that the reproducing apparatus comprises: a controller outputting a command to instruct reading of the identification data or audio data recorded in the corresponding at least one write unit; a reading portion for reading the identification data or audio data recorded in the corresponding at least one write unit, according to the command from the controller; and a reproduction portion for receiving and reproducing the identification data or the audio data from the reading portion.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF PREFERRED EMBODIMENTS

Reference will now be made in detail to the present preferred embodiments of the present invention, examples of which are illustrated in the accompanying drawings, wherein like reference numerals refer to like elements throughout.

Figure 2:
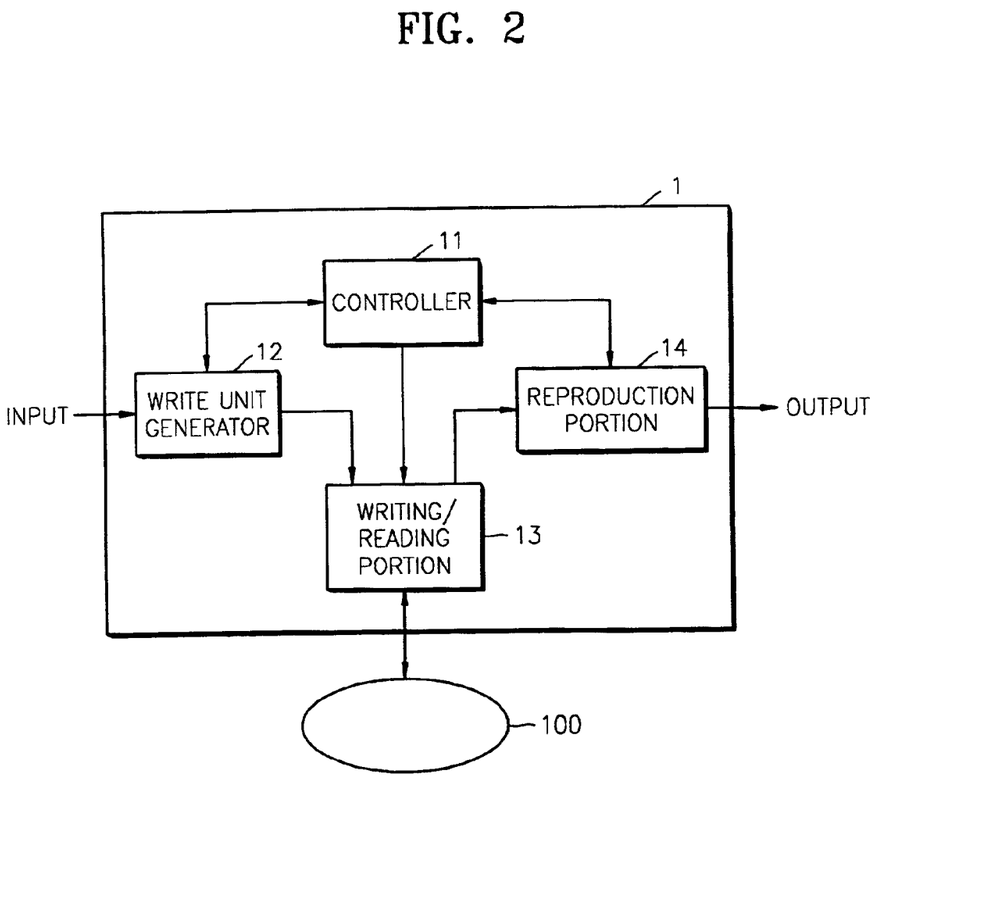
FIG. 2 is a block diagram of a recording and reproducing apparatus according to an embodiment of the present invention.

In recording audio data in a plurality of tracks of a recording medium, a recording and reproducing apparatus according to the present invention writes identification data for track identification to a corresponding track in predetermined write units, and externally input audio data in other write units. A preferred embodiment of the recording and reproducing apparatus according to the present invention is shown in FIG. 2. Referring to FIG. 2, the recording and reproducing apparatus 1, which records audio data, and mute data as identification data, includes a controller 11, a write unit generator 12, a writing/reading portion 13, and a reproduction portion 14.

In particular, the write unit generator 12 generates an audio object unit (AOBU) as a write unit. In the present invention, the AOBU includes an audio AOBU with audio data and a mute AOBU with mute data. The audio AOBU is created by processing audio data received from the outside and then adding header information to the resulting audio data. In the present embodiment, a mute AOBU with mute data is pre-created, and output from the write unit generator 12 when a mute data generation command is input from the controller 11 to the write unit generator 12. The number of the mute AOBUs is determined such that the sum of the duration of each of the mute AOBUs is equal to or slightly longer than a mute period in a reproduction mode. A predetermined number of the mute AOBUs may be directly transferred from the controller 11 to the writing/reading portion 13. Alternatively, the number of the mute AOBUs can be determined by the write unit generator 12 to correspond to a desired mute period informed from the controller 11.

The writing/reading portion 13 receives AOBUs from the write unit generator 12 and records the AOBUs in corresponding tracks, or reads AOBUs from predetermined tracks of a recording medium 100. The writing/reading portion 13 also writes a track start point received from the controller 11, which indicates the start of a track from which data is to be read, to a reproduction control information area of the recording medium 100, or reads the track start point from the reproduction control information area.

The controller 11 provides a mute AOBU generation command to the write unit generator 12, and provides an AOBU write command to the writing/reading portion 13 in a record mode. The controller 11 provides a track start point, which indicates the start of the track from which data is to be read, to the writing/reading portion 13 in a reproduction or record mode. In the reproduction mode, the controller 11 provides an AOBU read command to the writing/reading portion 13. The controller 11 also provides reproduction control information including the track start point of a track, from which data is to be read, to the writing/reading portion 13. Mute data are read from the track start point by the writing/reading portion 13, so that the duration from the track start point to the last mute AOBU of the track is referred to as a mute period. The mute period can be varied by moving the location of the track start point. The controller may include a user interface (not shown) for receiving instructions from a user to vary the location of the track start point. When a track start point exists in a single mute AOBU, or when a mute AOBU is encountered during reproduction of audio AOBUs from a track start point, the controller 11 outputs a mute command to the reproduction portion 14 such that the reproduction portion 14 performs a mute operation until all mute data ranging from the track start point to the last mute AOBU is read.

The reproduction portion 14 reproduces audio data from the AOBUs output from the writing/reading portion 13. When mute AOBUs are input, the reproduction portion 14 performs a mute operation according to the mute command from the controller 11.

In an audio recording medium according to the present invention, digital audio data are recorded in a plurality of tracks. Mute data as track identification data are recorded in at least one mute AOBU in each track, and digital audio data is recorded in at least one audio AOBU, following the mute data in the same track. The mute AOBU and the audio AOBU are segregated. In other words, the mute AOBU contains no audio data. Each of the mute AOBU and the audio AOBU has approximately the same duration. For convenience of explanation, it is assumed that the duration of each AOBU is 1 second long. The duration of each AOBU can be varied as needed.

Figure 3:
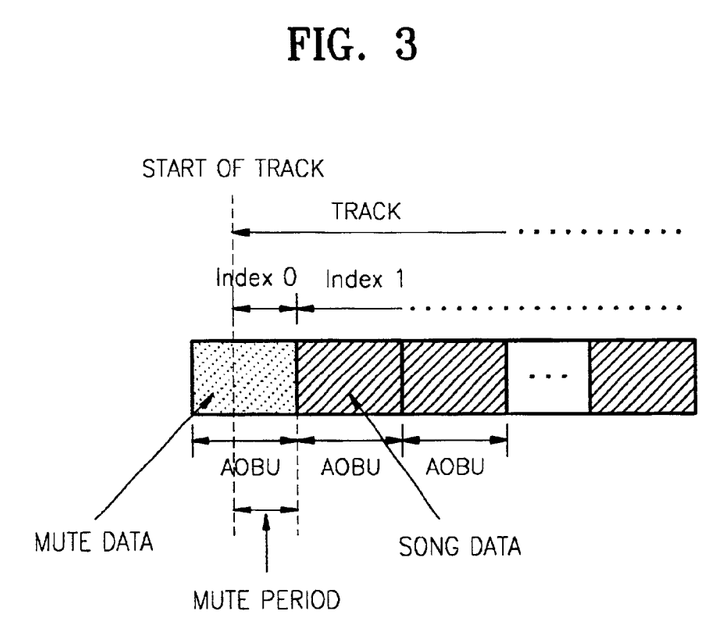
FIG. 3 illustrates an audio recording medium according to an embodiment of the present invention, in which mute data and digital audio data are written on a track of the audio recording medium.

FIG. 3 illustrates an embodiment of an audio recording medium according to the present invention, in which mute data and audio data are written to a track with a target mute period not longer than the duration of a single AOBU. Referring to FIG. 3, in recording digital audio data in a track, if there is a need to define a mute period in the track, mute data are recorded at the start of the track in units of AOBU. In the present embodiment, the mute period is shorter than or equal to the 1-second duration of the AOBU, and thus one mute AOBU is long enough to record the mute data therein. As shown in FIG. 3, the mute period is equivalent to the duration from the start of the track, at which reproduction starts, to the end of the mute AOBU. It will be appreciated that the mute period can be varied by changing the location of the track start point. Here, the location of the track start point can be optionally moved by users. On the other hand, input audio data to be recorded are processed and packed in units of AOBU segregated from the mute AOBUs, and then recorded following the mute data in the track.

Figure 4:
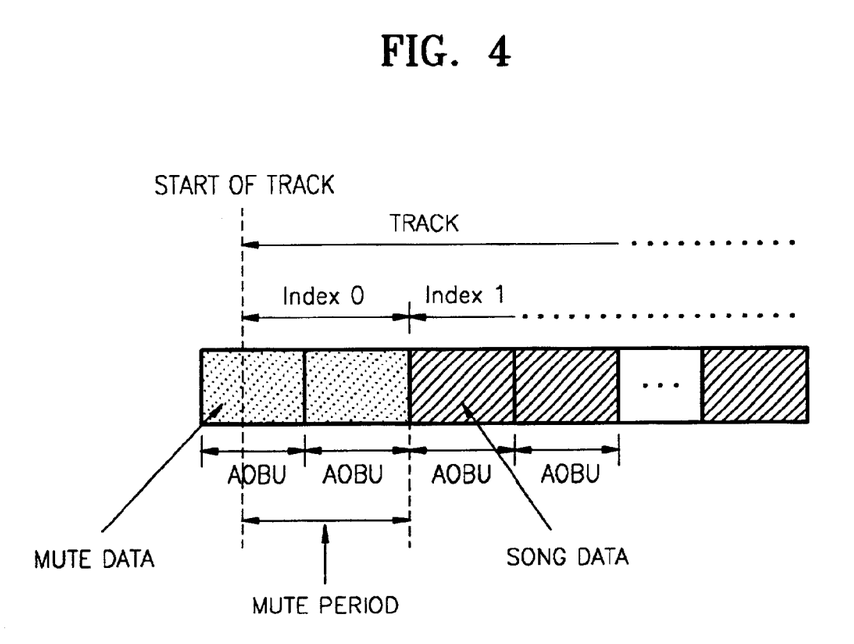
FIG. 4 illustrates an audio recording medium according to another embodiment of the present invention, in which mute data and digital audio data are written on a track of the audio recording medium.

FIG. 4 illustrates another embodiment of the audio recording medium according to the present invention, in which mute data and audio data are written to a track with a mute period longer than the duration of a single AOBU. Since the mute period exceeds the 1-second duration of the AOBU, mute data are recorded in successive mute AOBUs at the start of the track. It is preferable that the number of mute AOBUs is determined such that the sum of the duration of each of the mute AOBUs is equal to or slightly longer than a target mute period.

For example, if the duration of each AOBU is set at 1 second and a target mute period is set at 1.5 seconds, the mute data are recorded in two mute AOBUs in a corresponding track. In particular, the duration of a single AOBU is multiplied by the smallest integer which gives a product that is slightly longer than the mute period. In this example, the product that satisfies this condition is 2 AOBU durations. Accordingly, the mute data are recorded in 2 mute AOBUs. The location of the track start point is set such that a total duration for the mute data ranging from the track start point to the last mute AOBU is equal to the mute period. Like the embodiment described with reference to FIG. 3, input audio data to be recorded are processed and packed as AOBUs segregated from the mute AOBUs, and then recorded following the mute data in the track.

As described with reference to FIGS. 3 and 4, in the audio recording media according to the present invention, mute data and audio data are recorded in segregated AOBUs, unlike a conventional recording medium in which mute data and audio data are recorded within the same write unit. Accordingly, the mute data can be removed by deleting mute AOBUs as needed. This is because such a structure of the inventive audio recording media allows a recording/reproducing apparatus to record, edit or delete data in write units.

On the other hand, like CDs, Index 0 is appended to the mute period. Information on the mute period, Index 0, is written to a reproduction control information area. When digital audio data having the mute period (Index 0) at the start of each track are received from a recorder-equipped CD player (so-called CD recording/reproducing apparatus) through a digital audio interface (not shown) of the recording and reproducing apparatus 1 shown in FIG. 2, and recorded by the recording and reproducing apparatus 1, the recording and reproducing apparatus 1 records mute data in units of AOBUs to correspond to the mute period. The recording and reproducing apparatus sets the location of the track start point such that the period from the track start point to the start point of audio data area is equal to the mute period, and assigns Index 0 to the period from the track start point to the start point of audio data area. The recording and reproducing apparatus 1 records the mute period with Index 0 in a reproduction control information area of the recording medium 100. When successive tracks are reproduced from the recording medium 100 by the recording and reproducing apparatus 1, the sound is muted for the mute period with Index 0 when the reproduction moves from the current track to the next track, and then audio data of the next track following the mute period are reproduced.

Figure 5:
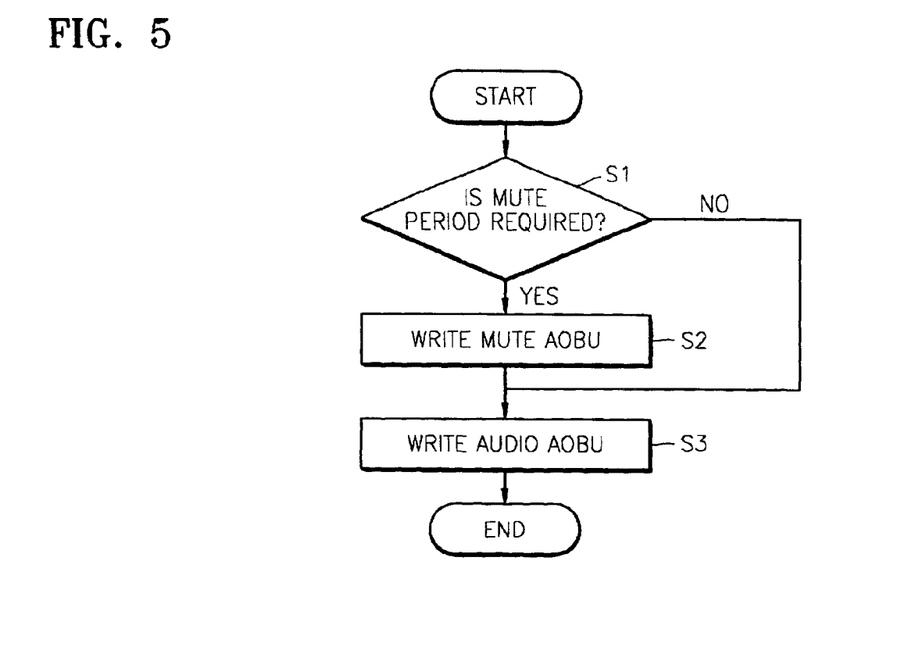
FIG. 5 is a flowchart illustrating a digital audio data recording method according to an embodiment of the present invention.

FIG. 5 is a flowchart illustrating a digital audio data recording method according to an embodiment of the present invention. Referring to FIG. 5, in a record mode, the controller 11 of the recording and reproducing apparatus 1 checks whether a mute period is required in recording a new data track (operation S1). If a mute period is required, the controller 11 transfers a mute AOBU generation command to the write unit generator 12. At this time, information on the number of mute AOBUs to be generated, or the mute period is also provided to the write unit generator 12. The write unit generator 12 generates mute AOBUs according to the information on the number of the mute AOBUs or the mute period, which has been received from the controller 11, and provides the mute AOBU to the writing/reading portion 13. The writing/reading portion 13 writes the mute AOBU to a corresponding track (operation S2). If the mute period is equal to or shorter than the duration of a single AOBU, the number of the mute AOBUs to be written is 1. As described above, the mute period can be adjusted by moving the location of the track start point. The controller 11 assigns Index 0 to the mute period, and outputs a write command to the writing/reading portion 13 such that the writing/reading portion 13 writes Index 0 to a reproduction control information area. Next, the recording and reproducing apparatus 1 writes an audio AOBU following the mute AOBU( operation S3).

Figure 6:
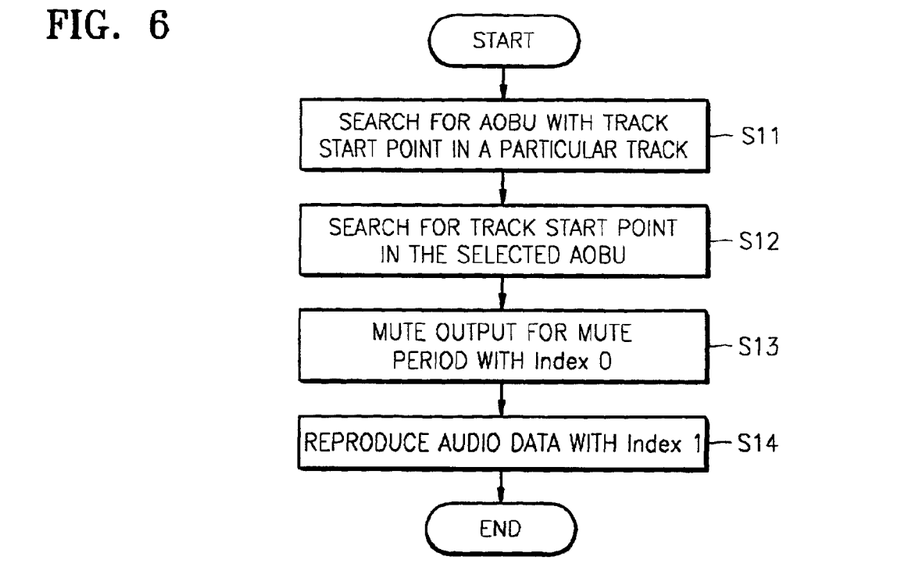
FIG. 6 is a flowchart illustrating a digital audio data reproduction method according to an embodiment of the present invention.

FIG. 6 is a flowchart illustrating an embodiment of a digital audio data reproduction method according to the present invention. Referring to FIG. 6, in a reproduction mode, the controller 11 of the recording and reproducing apparatus 13 transfers reproduction control information corresponding to a user's input to the writing/reading portion 13, and then the writing/reading portion 13 searches for an AOBU having the track start point in a corresponding track (operation S11). If the index 0 is recorded in the reproduction control information area of the audio recording medium, the index 0 can be used to reproduce the data with or without user input. Next, the writing/reading portion 13 searches for the track start point in the selected AOBU operation S12).

The writing/reading portion 13 reads mute data having Index 0, which are recorded in units of AOBU, from the track start point, and transfers the read mute data to the reproduction portion 14. The reproduction portion 14 mutes the operation for the duration of the mute data (operation S13). The content and format of the mute data can be varied as long as the intrinsic function of the mute data, i.e., to mute the operation for the mute period, can be achieved. Muting the output from the recording unit 14 can be achieved in many different ways. For example, unlike operation S13, once the writing/reading portion 13 reads mute data, the controller 11 outputs a mute command to the reproduction portion 14, and then the reproduction portion 14 performs the mute operation in response to the mute command.

After a lapse of the mute period, the writing/reading portion 13 reads audio data having Index 1 in units of AOBU, and outputs the read audio data to the reproduction portion 14. The reproduction portion 14 reproduces audio data by decoding the audio data received in units of AOBU (operation S14).

Although recording and reproduction of audio data have been described with reference to the recording and reproduction apparatus 1, i.e., which has both recording and reproducing units, separate recording and reproducing apparatuses can be applied. A recording-only apparatus can be constructed by removing the reproduction portion 14 from the recording and reproducing apparatus 1 of FIG. 2. In this case, reading of data by the writing/reading portion 13, and the control operation for reproduction by the controller 11 are not required. A reproduction-only apparatus can be constructed by removing the write unit generator 12 from the recording and reproducing apparatus 1 of FIG. 2. In a similar way, writing of data by the writing/reading portion 13, and the control operation for writing of data by the controller are unnecessary.

The recording and reproducing apparatus according to the present invention can seek for and reproduce just audio data, i.e., digital audio data in the embodiments of the present invention, recorded in a particular track, without reproducing mute data as needed. The audio recording medium according to the present invention stores mute data and audio data in segregated AOBUs, and thus the start point of audio data a user desires to reproduce can be simply found by searching for the location of the audio AOBU. In other words, when audio data are reproduced from a conventional recording medium by a conventional reproducing apparatus, two stages of searching are required: for the location of an AOBU containing target audio data throughout the recording medium, and then for the location of the audio data within the AOBU. In contrast, as for the recording medium, and the recording and reproducing apparatus according to the present invention, target audio data can be reproduced by searching for just the location of the start AOBU of the audio data. Thus, a searching time can be shortened.

As previously mentioned, according to the present invention, mute data that serve as track identification data for a plurality of tracks to which audio data are recorded, are recorded in write units segregated from audio data. Thus, mute data can be easily removed if a user desires to reproduce just audio data without a mute period. In addition, by moving the location of the track start point in a target track, a length of the period of Index 0, i.e., the duration of mute period, can be easily adjusted. According to the present invention, when digital audio data being reproduced from a conventional CD by a CD player are recorded, the periods of Index 0 allocated to tracks of the CD can be recorded.

While this invention has been particularly shown and described with reference to preferred embodiments thereof, it will be understood by those skilled in the art that various changes in form and details may be made to the described embodiments without departing from the spirit and scope of the invention as defined by the appended claims.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An audio recording medium, comprising:
   a plurality of tracks;
   audio data recorded in the plurality of tracks; and identification data for indicating a start position of each of the tracks recorded in write units segregated from the audio data in the plurality of tracks, wherein each write unit includes an audio object unit (AOBU), and the identification data includes mute data, a mute period for the mute data is equal to or shorter than the duration of a single one of the AOBUs, and the mute period has a duration from a track start point to an end of the AOBU with mute data, and the mute period is varied by moving a location of the track start point.

2. An audio recording medium, comprising:

a plurality of tracks;

audio data recorded in the plurality of tracks; and identification data for indicating a start position of each of the tracks recorded in write units segregated from the audio data in the plurality of tracks, wherein each write unit includes an audio object unit (AOBU), and the identification data includes mute data, and a mute period for the mute data is longer than the duration of a single one of the AOBUs, and a number of the AOBUs with mute data in each track is determined such that a sum of a duration of each of the AOBUs with mute data in each track is equal to or slightly longer than the mute period.

3. The audio recording medium of claim 2, wherein the mute period includes a period from a track start point to an end of a last one of the AOBUs among the plurality of the AOBUs with mute data in each track, and the mute period is varied by moving the location of the track start point.

4. A method of recording data in a plurality of tracks of a recording medium, and reproducing data from the recording medium, the method comprising:

recording identification data indicating a start position of each of the tracks in predetermined write units in the plurality of tracks;

recording audio data in write units segregated from the predetermined write units of the identification data in the plurality of tracks;

reading and reproducing the identification data recorded in the predetermined write units; and reading and reproducing the audio data recorded in the write units segregated from the predetermined write units of the identification data, wherein the recording of the identification data comprises recording the identification data in at least one write unit at a start of each of the tracks, each write unit includes an audio object unit (AOBU), and the identification data includes mute data, a mute period for the mute data is equal to or shorter than a duration of a single one of the AOBUs, and the mute period includes a duration from a track start point to an end of the AOBU with mute data, the method further comprising varying the mute period by moving a location of the track start point.

5. A method of recording data in a plurality of tracks of a recording medium, and reproducing data from the recording medium, the method comprising:

recording identification data indicating a start position of each of the tracks in predetermined write units in the plurality of tracks;

recording audio data in write units segregated from the predetermined write units of the identification data in the plurality of tracks;

reading and reproducing the identification data recorded in the predetermined write units; and reading and reproducing the audio data recorded in the write units segregated from the predetermined write units of the identification data, wherein the recording of the identification data comprises recording the identification data in at least one write unit at a start of each of the tracks, each write unit includes an audio object unit (AOBU), and the identification data includes mute data, and a mute period for the mute data is longer than the duration of a single one of the AOBUs, and a number of the AOBUs with mute data in each track is determined such that a sum of the duration of each of the AOBUs with audio data in each track is equal to or slightly longer the mute period.

6. The method of claim 2, wherein the mute period includes a duration from a track start point to an end of a last one of AOBUs among the plurality of the AOBUs with mute data, the method further comprising varying the mute period by moving a location of the track start point.

7. A method of reproducing data recorded in a plurality of tracks of a recording medium, the method comprising:

reading and reproducing identification data indicating a start position of each of the tracks, the identification data having been recorded in write units in the tracks of the recording medium;

reading and reproducing audio data having been recorded in write units segregated from the write units of the identification data in the tracks of the recording medium, wherein the identification data have been recorded in at least one write unit at a start of each of the tracks and each write unit includes an audio object unit (AOBU), and the identification data includes mute data;

performing a mute operation for a mute period, wherein the mute period for the mute data is equal to or shorter than a duration of a single AOBUs; and varying the mute period by moving a location of a track start point, wherein the mute period includes a duration from the track start point to an end of the AOBU with mute data.

8. A method of reproducing data recorded in a plurality of tracks of a recording medium, the method comprising:

reading and reproducing identification data indicating a start position of each of the tracks, the identification data having been recorded in write units in the tracks of the recording medium;

reading and reproducing audio data having been recorded in write units segregated from the write units of the identification data in the tracks of the recording medium, wherein the identification data have been recorded in at least one write unit at a start of each of the tracks and each write unit includes an audio object unit (AOBU), and the identification data includes mute data; and performing a mute operation for a mute period, wherein the mute period for the mute data is longer than a duration of a single one of the AOBUs, and a number of the AOBUs with mute data in each track is determined such that a sum of a duration of each of the AOBUs in each track is equal to or slightly longer than the mute period.

9. The method of claim 8, further comprising varying the mute period by moving a location of a track start point, wherein the mute period includes a duration from the track start point to an end of a last one of the AOBUs among the plurality of the AOBUs with mute data in each track, and the mute period is varied by moving a location of the track start point.

10. A method of recording data in a plurality of tracks of a recording medium, and reproducing data from the recording medium, the method comprising:

determining whether there is a need to record identification data indicating a start position of each of the tracks in a corresponding one of the tracks;

if recording of the identification data is needed, recording the identification data in the corresponding track in at least one write unit; and recording audio data in the corresponding track in at least one write unit segregated from the at least one write unit of the identification data.

11. The method of claim 10, wherein the recording of the audio data comprises recording the identification data in the at least one write unit at a start of each of the tracks.

12. The method of claim 11, wherein the recording of the audio data comprises recording the audio data in the at least one write unit, following the at least one write unit of the identification data.

13. The method of claim 12, further comprising:

reading and reproducing the identification data recorded in the at least one write unit at a start of each of the tracks; and successively reading the audio data recorded in the at least one write unit, following the identification data, and reproducing the read audio data.

14. The method of claim 13, wherein each write unit includes an audio object unit (AOBU), and the identification data includes mute data.

15. An apparatus for recording data in a plurality of tracks of a recording medium, in which identification data indicating a start position of each of the tracks are recorded in write units in each of the tracks, and audio data are recorded in write units segregated from the write units of the identification data in each of the tracks, wherein the apparatus records the identification data in the at least one write unit at a start of each of the tracks and the apparatus records the audio data in the at least one write unit, following the at least one write unit with the identification data, comprising:

a write unit generator generating the at least one write unit audio data, and the at least one write unit with the identification data;

a write portion writing each of the at least one write unit with the audio data and the at least one write unit with the identification data in the corresponding tracks; and a controller outputting a command to the write operation to instruct generation of the at least one write unit with the identification data to the write portion, wherein each write unit includes an audio object unit (AOBU), and the identification data includes mute data, the controller outputs a track start point to the writing portion, the track start point allowing a mute period for the mute data to be equal to or shorter than a duration of a single one of the AOBUs with the mute data, the write portion writes the track start point from the controller in a reproduction control information area of the recording medium, and the mute period includes a duration from the track start point to an end of the AOBU with mute data, and the mute period is varied by moving the location of the track start point.

16. An apparatus for recording data in a plurality of tracks of a recording medium, in which identification data indicating a start position of each of the tracks are recorded in write units in each of the tracks, and audio data are recorded in write units segregated from the write units of the identification data in each of the tracks, wherein the apparatus records the identification data in the at least one write unit at a start of each of the tracks and the apparatus records the audio data in the at least one write unit, following the at least one write unit with the identification data, comprising:

a write unit generator generating the at least one write unit audio data, and the at least one write unit with the identification data;

a write portion writing each of the at least one write unit with the audio data and the at least one write unit with the identification data in the corresponding tracks; and a controller outputting a command to the write operation to instruct generation of the at least one write unit with the identification data to the write portion, wherein each write unit includes an audio object unit (AOBU), and the identification data includes mute data, the controller outputs a track start point to the writing portion, the track start point allowing a mute period for the mute data to be longer than a duration of a single one of the AOBUs, and the controller outputs information on a number of the AOBUs with mute data corresponding to the mute period to the write unit generator, and the write unit generator generates the number of AOBUs with mute data according to the information from the controller.

17. The apparatus of claim 16, wherein the mute period includes a duration from the track start point to an end of a last one of AOBUs among the AOBUs with mute data in each track, and the controller varies the mute period by moving the location of the track start point in response to an input from a user.

18. The apparatus of claim 17, wherein the write generator determines the number of the AOBUs with mute data such that a sum of a duration of each of the AOBUs with mute data in each track is equal to or slightly longer than the mute period.

19. An apparatus for reproducing data recorded in a plurality of tracks of a recording medium, in which identification data recorded in predetermined write units to indicate a start position of each of the tracks are read from each of the tracks and reproduced, and audio data recorded in write units segregated from the write units of the identification data are read from each of the tracks and reproduced, wherein the apparatus reads and reproduces the identification data recorded in at least one of the write units at the start of each of the tracks and the apparatus reads and reproduces the audio data recorded following the identification data in at least one of the write units segregated from the at least one write unit of the identification data, comprising:

a controller outputting a command to instruct reading of the identification data or the audio data recorded in the corresponding at least one write unit;

a reading portion reading the identification data or the audio data recorded in the corresponding at least one write unit, according to the command from the controller; and a reproduction portion receiving and reproducing the identification data or the audio data from the reading portion, wherein each write unit includes an audio object unit (AOBU), and the identification data includes mute data, the controller outputs reproduction control information corresponding to an input from a user to the reading portion, the reading portion searches for the AOBU having a track start point in a corresponding track, finds a location of the track start point in the found AOBU, read data from the track start point in the corresponding track, and outputs the read data to the reproduction portion, and a mute period for the mute data includes a duration from the track start point to an end of the AOBU with mute data, and the controller varies the mute period by moving the location of the track start point in response to an input from a user.

20. The apparatus of claim 19, wherein once the reading portion reads the AOBU with the mute data and outputs the read AOBU to the reproduction portion, the reproduction portion mutes outputs for the mute period.

21. The apparatus of claim 20, wherein once the AOBU with mute data is read by the reading portion, the controller outputs a mute command to the reproduction portion, and the reproduction portion performs a mute operation according to the mute command from the controller.

22. A method of recording data on an audio recording medium having a plurality of tracks, comprising:

recording mute data in at least one write unit in each of the tracks; and recording audio data in at least one write unit in each of the tracks so as to be segregated from the at least one write unit of the mute data, wherein the recording of the mute data comprises determining whether a mute period is required in recording a new one of the tracks, determining a number of the write units of mute data to be recorded in the new track, recording the number of write units of the mute data in the new track, and writing the mute period in a reproduction control information area of the audio recording medium, and wherein the recording of the audio data comprises writing the audio data following the mute data in the new track.

* * * * *